(12) United States Patent
Gretz (10) Patent No.: US 8,476,525 B1
(45) Date of Patent: Jul. 2, 2013

(54) ELECTRICAL DEVICE MOUNTING ASSEMBLY FOR ANGLED MOUNTING OF HIGH AND LOW VOLTAGE COMPONENTS

(75) Inventor: Thomas J. Gretz, Port St. Lucie, FL (US)

(73) Assignee: Arlington Industries, Inc., Scranton, PA (US)

( * ) Notice: Subject to any disclaimer, the term of this patent is extended or adjusted under 35 U.S.C. 154(b) by 316 days.

(21) Appl. No.: 12/928,223

(22) Filed: Dec. 7, 2010

(51) Int. Cl.
    *H02B 1/30* (2006.01)
(52) U.S. Cl.
    USPC .......................................................... 174/63
(58) Field of Classification Search
    USPC ................. 174/63, 38, 50, 53, 57, 58, 60, 61, 174/480
    See application file for complete search history.

(56) References Cited

U.S. PATENT DOCUMENTS

| | | | |
|---|---|---|---|
| 5,965,844 | A | 10/1999 | Lippa |
| 6,147,304 | A | 11/2000 | Doherty |
| 7,038,132 | B1 | 5/2006 | Lowe et al. |
| 7,078,618 | B2 | 7/2006 | Dinh |
| 7,304,236 | B1 | 12/2007 | Gretz |

*Primary Examiner* — Jeremy Norris
*Assistant Examiner* — Tremesha S Willis (57) ABSTRACT

An electrical device mounting assembly for recessed mounting of high and low voltage components in order to provide electrical power and low voltage signals to a television or home entertainment center is provided. Mounting surfaces are provided within the mounting assembly to recess electrical components therein and behind the wall surface. The assembly includes a mounting frame for receipt of mounting devices such as high voltage boxes and low voltage mounting plates. The mounting devices are secured at an angle with respect to the mounting frame, thereby minimizing the depth of the mounting frame while providing sufficient space for recessing plug ends of electrical cords and terminal ends of signal cables within the wall. The electrical device mounting assembly provides a recessed area on a wall for mounting all the various electrical and signal hookups for a television or home entertainment system.

20 Claims, 8 Drawing Sheets

ELECTRICAL DEVICE MOUNTING ASSEMBLY FOR ANGLED MOUNTING OF HIGH AND LOW VOLTAGE COMPONENTS

FIELD OF THE INVENTION

This invention relates to electrical box assemblies for mounting components for high and low voltage devices and specifically to an electrical device mounting assembly that can be easily installed on an interior wall of a building and provide high and low voltage components connections to a television, computer, or home stereo system.

BACKGROUND OF THE INVENTION

With the proliferation of high definition televisions and various auxiliary devices, such as digital videodisc players, game stations, and surround sound systems, there is a need to manage the connections between these devices to ensure there is adequate power and also to manage the myriad of cables and cords that accompany such systems. Additionally, many electrical boxes for both high and low voltage components mount the components flush with the wall, which makes the plugs or connectors that mate with the wall-mounted components protrude from the wall, thereby making it difficult to mount an electrical device such as a television close to the wall. Electrical plugs or cords that extend from the wall are also susceptible to damage, such as from vacuum cleaners or other household hazards which may brush against the plugs or cords.

What is needed therefore is an electrical device mounting assembly that provides connection points for both high and low voltage components, provides isolation of high voltage connections from low voltage connections, provides features for managing the plethora of cables and wiring associated with modern television systems, and recesses the end connector of cords or cables to protect the plug ends of cords or end connectors of cables from undesirable contact with household appliances or household occupants. Furthermore, for electrical mounting assemblies that recess the ends of electrical cords within the wall, it is desirable to minimize the depth of the mounting assemblies to minimize the size and cost of manufacturing such assemblies.

SUMMARY OF THE INVENTION

The invention is an electrical device mounting assembly that enables mounting of high and low voltage components in a single assembly for providing electrical supply and low voltage signals to a television or home entertainment center. The electrical device mounting assembly provides mounting locations for recessing various electrical components behind the wall surface to make them unobtrusive and out of the way. The mounting assembly includes a mounting frame for housing high voltage electrical boxes and low voltage mounting plates. The mounting frame enables mounting of the high voltage boxes and low voltage mounting plates at an angle with respect to the wall, thereby minimizing the depth of the mounting frame while providing sufficient space for recessing plug ends of electrical cords and terminal ends of signal cables within the wall. The low voltage mounting plates are capable of accepting standard jacks for broadband cable, direct TV, surround sound cabling, or phone systems. The electrical device mounting assembly enables easy consolidation of all the various electrical and signal hookups for TV or home entertainment systems.

OBJECTS AND ADVANTAGES

The electrical device mounting assembly of the present invention provides several advantages over the prior art, including:

(1) Mounting surfaces are provided for mounting both high and low voltage components. An electrical box, integral with the box member of the assembly, is provided for housing and isolating high voltage components, such as a duplex receptacle to provide line voltage to a TV or other electrical device. Mounting surfaces are also provided for mounting several low voltage components, such as a coupling plate for a coaxial cable.

(2) Mounting surfaces are at an angle with respect to the front of the electrical device mounting assembly thereby advantageously minimizing the depth of the mounting assembly.

(3) The electrical device mounting assembly includes a mounting frame that extends within the wall, thereby recessing electrical components within the wall to render them unobtrusive and out of the way. Recessing the electrical components enables mounting the recipient electrical device, such as a television, substantially flush against the wall and also advantageously recesses the plug ends of cords or end connectors of cables within the wall surface.

(4) The electrical device mounting assembly provides features for managing the plethora of cables and wiring associated with modern television systems thereby providing a clean installation that is unobtrusive and minimizes the amount of wires and cables running between the wall and the television, speaker system, or other components of a home entertainment system.

These and other objects and advantages of the present invention will be better understood by reading the following description along with reference to the drawings.

TABLE OF NOMENCLATURE

The following is a listing of part numbers used in the drawings along with a brief description:

| Part Number | Description |
| --- | --- |
| 20 | electrical device mounting assembly, first embodiment |
| 22 | mounting frame |
| 24 | low voltage mounting plate |
| 26 | high voltage box |
| 28 | trim plate |
| 30 | side wall |
| 32 | end wall |
| 34 | back wall |
| 35 | corner wall |
| 36 | aperture in back wall |
| 38 | open area |
| 40 | tab |
| 42 | cable opening |
| 44 | boss |
| 46 | front face of mounting frame |
| 48 | spacer |
| 50 | front face of spacer |
| 52 | slot |
| 54 | gap |
| 56 | enclosure of mounting frame |
| 58 | brace |
| 60 | second brace |
| 62 | raised area |
| 64 | first frame |
| 66 | second frame |
| 68 | corner wall of frame |
| 70 | first lip |
| 72 | mounting boss |
| 73 | mounting bore |
| 74 | second lip |
| 75 | frame opening |
| 76 | component connection point |
| 78 | component bore |
| 79 | component boss |
| 80 | back side of low voltage plate |
| 82 | filet |
| 84 | sidewall of electrical box |
| 86 | end wall of electrical box |
| 88 | electrical box enclosure |
| 90 | recessed area |
| 92 | knockout |
| 94 | stud |
| 96 | fastener |
| 98 | fastener |
| 99 | attachment arrangement |
| 100 | duplex receptacle |
| 102 | CATV connector plate |
| 104 | end flange |
| 106 | inner aperture |
| 108 | outer aperture |
| 110 | fastener |
| 112 | bore |
| 114 | opening in trim plate |
| 116 | mounting fastener |
| 120 | electrical device mounting assembly, second embodiment |
| 122 | trim plate |
| 124 | first end flange |
| 126 | second end flange |
| 130 | fastener |
| 132 | end of trim plate |
| 134 | electrical fitting or connector |
| $\Theta 1$ | angle of first brace with respect to front face |
| $\Theta 2$ | angle of second brace with respect to front face |
| $\Theta 3$ | angle of first frame with respect to second frame |
| $\Theta 4$ | angle of first lip with respect to first frame |
| $\Theta 5$ | angle of second lip with respect to second frame |
| D1 | depth of mounting frame |
| D2 | spacing between apertures in trim plate |

DETAILED DESCRIPTION OF THE INVENTION

Figure 1:
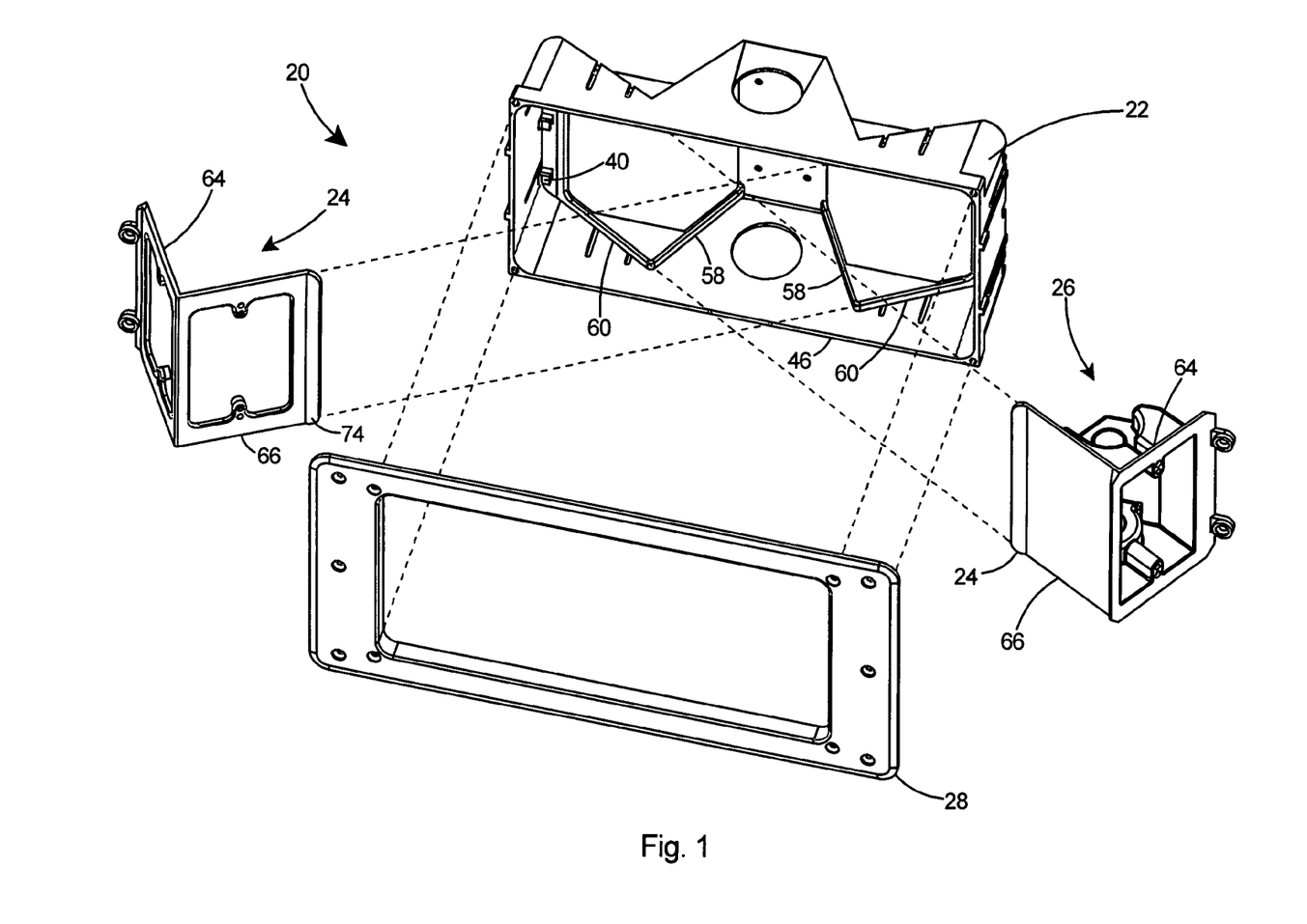
FIG. 1 is an exploded perspective view of a first embodiment of an electrical device mounting assembly according to the present invention.
Figure 2:
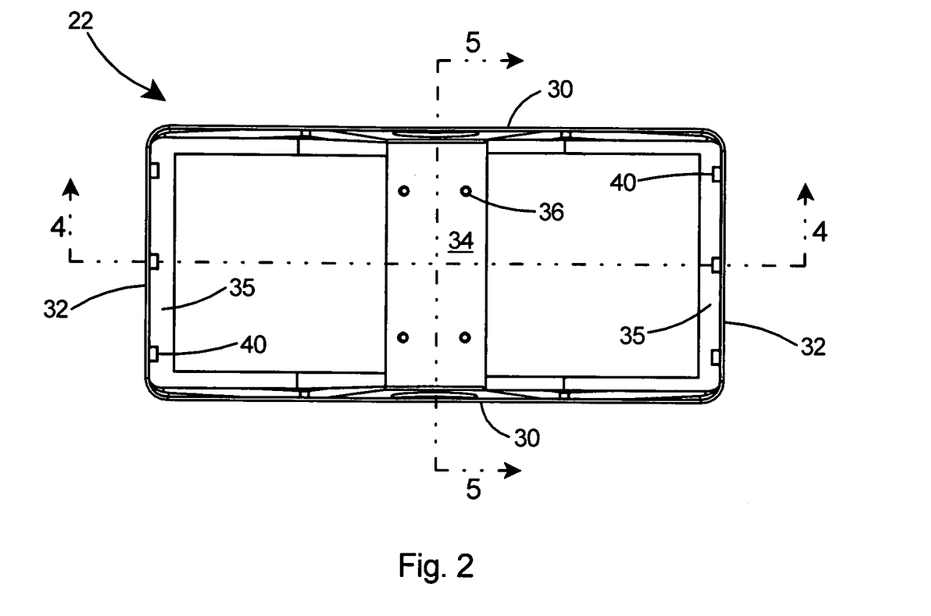
FIG. 2 is a front view of a mounting frame that forms a portion of the electrical device mounting assembly of FIG. 1.
Figure 3:
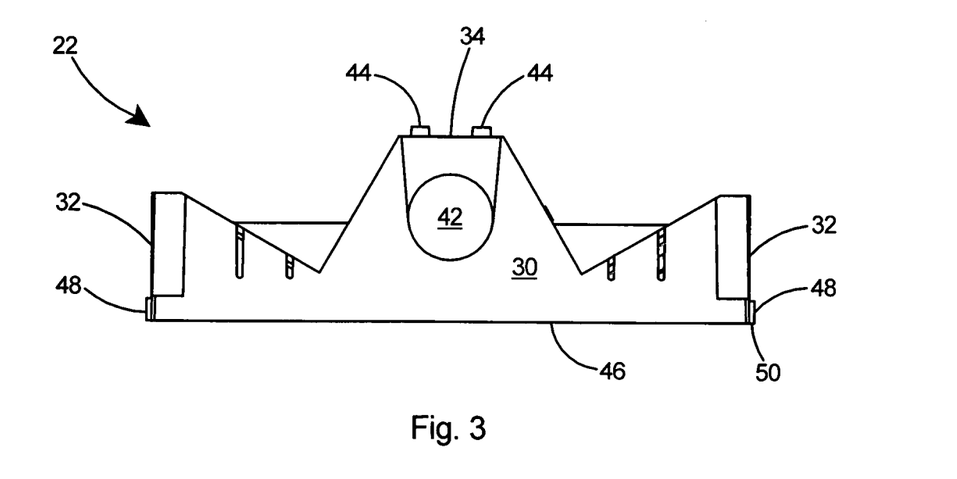
FIG. 3 is a side view of the mounting frame as viewed from the top side of FIG. 2.

With reference to FIG. 1 there is shown a first embodiment of an electrical device mounting assembly 20 according to the present invention. The electrical device mounting assembly 20 includes a mounting frame 22, two mounting devices including a low voltage mounting plate 24 and a high voltage box 26, and a trim plate 28.

Figure 4:
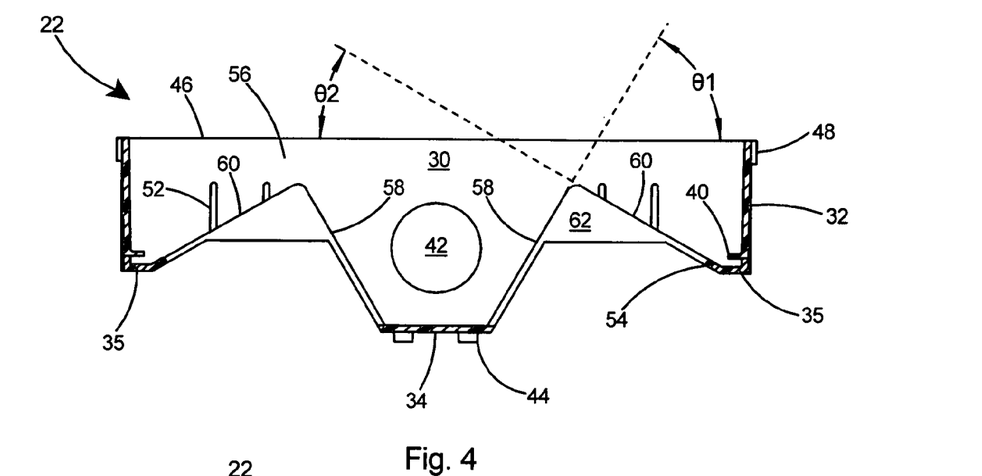
FIG. 4 is a sectional view of the mounting frame taken along line 4-4 of FIG. 2.
Figure 5:
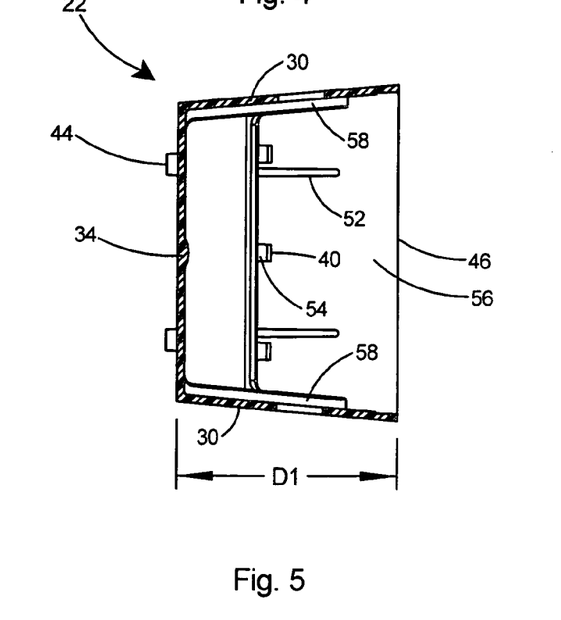
FIG. 5 is a sectional view of the mounting frame taken along line 5-5 of FIG. 2.

Referring to FIGS. 2-5, the mounting frame 22 has walls 30 and 32 including two side walls 30 and two end walls 32, a back wall 34 extending over a portion of the rear of the mounting frame 22 at its center and two corner walls 35. Several apertures 36 are provided in the back wall 34. Two large open areas 38 are provided on either side of the partial back wall 34 and a plurality of tabs 40 are provided on the mounting frame 22 extending inward from the end walls 32. The side walls 30 include cable openings 42 therein and the back wall 34 includes bosses 44 that are coincident with the apertures 36 in the back wall. The side walls 30 and end walls 32 of the mounting frame 22 terminate in a planar front face 46. Integral spacers 48 extend outwards from the end walls 32 and each include a flat front face 50 that is planar with the front face 46 of the mounting frame 22. The integral spacers 48 are preferably ½-inch in length and thereby enable an installer to rapidly and accurately orient the mounting frame 22 with respect to a stud (not shown) in a new work situation in order to properly allow the proper spacing for applying conventional ½-inch drywall over the stud. A plurality of slots 52 are provided in the side walls 30 and end walls 32 of the mounting frame 22. The tabs 40 are offset from the corner walls 35 thereby creating a gap 54 therebetween. As shown in FIG. 4, the mounting frame 22 includes an enclosure 56 defined by the side walls 30 and end walls 32 and a plurality of braces 58 and second braces 60 extending from each of the side walls 30 into the enclosure 56. Each brace 58 is at an angle of $\Theta 1$ with respect to the front face 46 and each second brace 60 is at an angle of $\Theta 2$ with respect to the front face 46. As will be described herein, it is critical to the present invention that the braces 58 and second braces 60 are each at an angle with respect to the front face 46 of the mounting frame 22 as this will insure that multiple component housings (not shown) can be mounted within the mounting frame 22 while minimizing the depth of the mounting frame 22 with the depth of the mounting frame 22 being defined as the distance between the front face 46 and the back wall 34 and shown as distance D1 in FIG. 5. Most preferably, the depth D1 of the mounting frame 22 according to the present invention is 3.8-inches or less, which depth is kept to a minimum by orienting the mounting devices 24 and 26 at an angle with respect to the front face 46 of the mounting frame 22. Thus, the mounting of the mounting devices 24 and 26 at the desired angle achieves the unexpected results of enabling the fitting of a substantial number of mounting devices 24 and 26 in a mounting assembly 20 that extends a relatively short distance into the wall while still providing space for recessing the installed electrical components and any connected electrical cord plugs. As shown in FIG. 4, the braces 58 and 60 are formed by substantially triangular-shaped raised areas 62 in the side walls 30 of the mounting frame 22. The raised areas 62 extend from both the top and bottom side walls 30 and provide the bracing surfaces 58 and 60 thereon.

Figure 6:
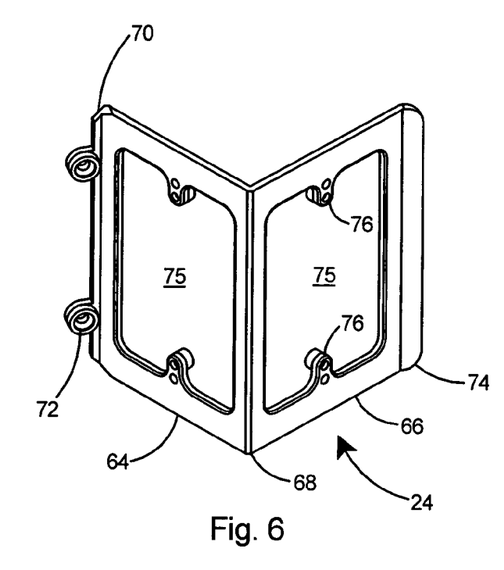
FIG. 6 is a perspective view of a low voltage plate that forms a portion of the electrical device mounting assembly of FIG. 1.
Figure 7:
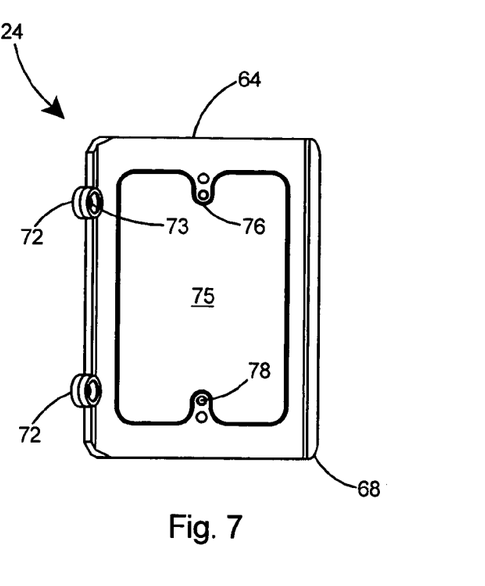
FIG. 7 is a side view of the low voltage plate of FIG. 6.
Figure 8:
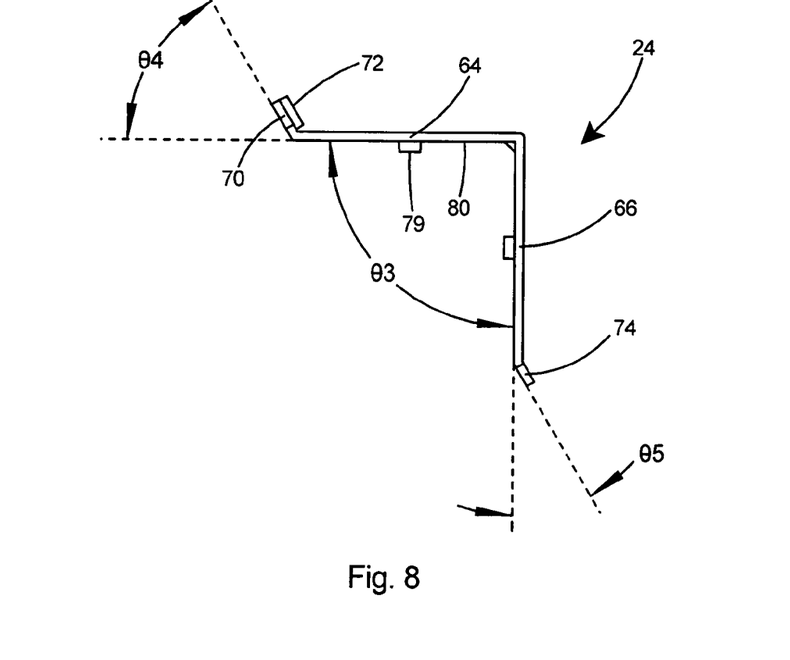
FIG. 8 is an end view of the low voltage plate of FIG. 6.

With reference to FIGS. 6-8 there is shown a low voltage mounting plate 24 that may form a portion of an electrical device mounting assembly according to the present invention. The low voltage mounting plate 24 includes a first frame 64 and a second frame 66 integral with one another at a corner wall 68. The frames 64 and 66 are at an angle Θ3 with respect to one another, which angle is preferably between 60 and 120 degrees and more preferably is 90 degrees, as depicted in FIG. 8. A first lip 70 extends at an angle Θ4 from the first frame 64 and two mounting bosses 72 having mounting bores 73 therein extend from the first lip 70. The second frame 66 also includes a second lip 74 extending there from with the second lip 74 extending at an angle Θ5 from the second frame 66. When the angle Θ3 of the first frame 64 with respect to the second frame 66 is 90 degrees, the angle Θ4 of the first lip 70 with respect to the first frame 64 is preferably 60 degrees and the angle Θ5 of the second lip 74 with respect to the second frame 66 is preferably 30 degrees. The frames include frame openings 75 therein. Component connection points 76 extend into the frame openings 75 and include component bores 78 therein. The component connection points 76 include component bosses 79 extending from the back side 80 of the low voltage mounting plate 24. A filet 82 is provided on the back side 80 of the low voltage mounting plate 24 extending between the frames 64 and 66. When the low voltage mounting plate 24 is molded of plastic, the filet 82 is molded integrally with the low voltage mounting plate 24 and adds strength to the plate 24 at the point where the two frames 64 and 66 meet.

Figure 9:
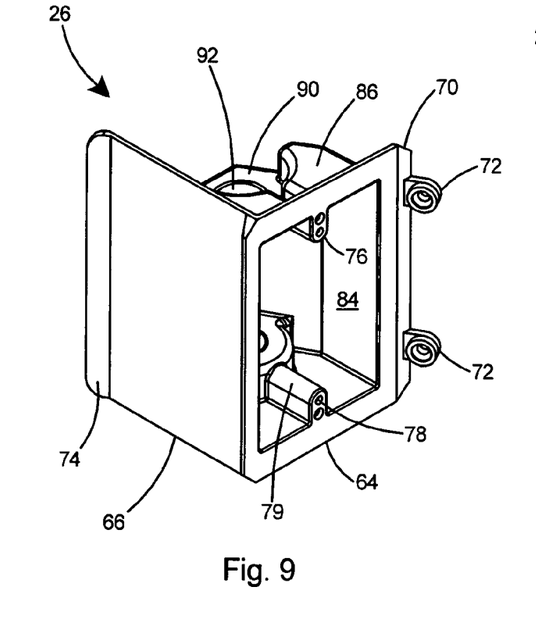
FIG. 9 is a perspective view of a high voltage box that forms a portion of the electrical device mounting assembly of FIG. 1.
Figure 10:
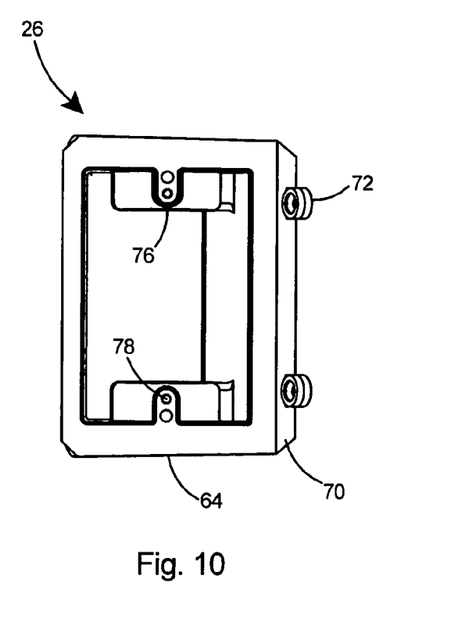
FIG. 10 is a side view of the high voltage box of FIG. 9.
Figure 11:
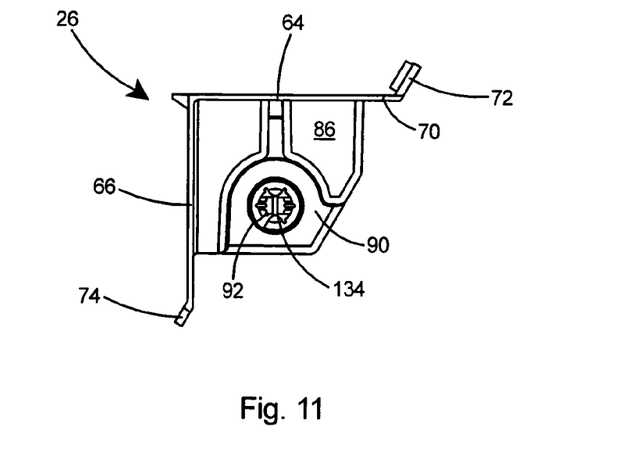
FIG. 11 is an end view of the high voltage box as viewed from the bottom of FIG. 9.

Referring to FIGS. 9-11, the high voltage box 26 includes many elements in common with the low voltage frame including a first frame 64, second frame 66, first lip 70, second lip 74, mounting bosses 72, and component connection points 76. The high voltage box 26 also includes a sidewall 84 and end walls 86 that cooperate with the second frame 66 to provide an electrical box enclosure 88 for accepting a high voltage electrical component (not shown) therein. A recessed area 90 is provided in each end wall 86 with a knockout 92 provided in each recessed area.

Figure 12:
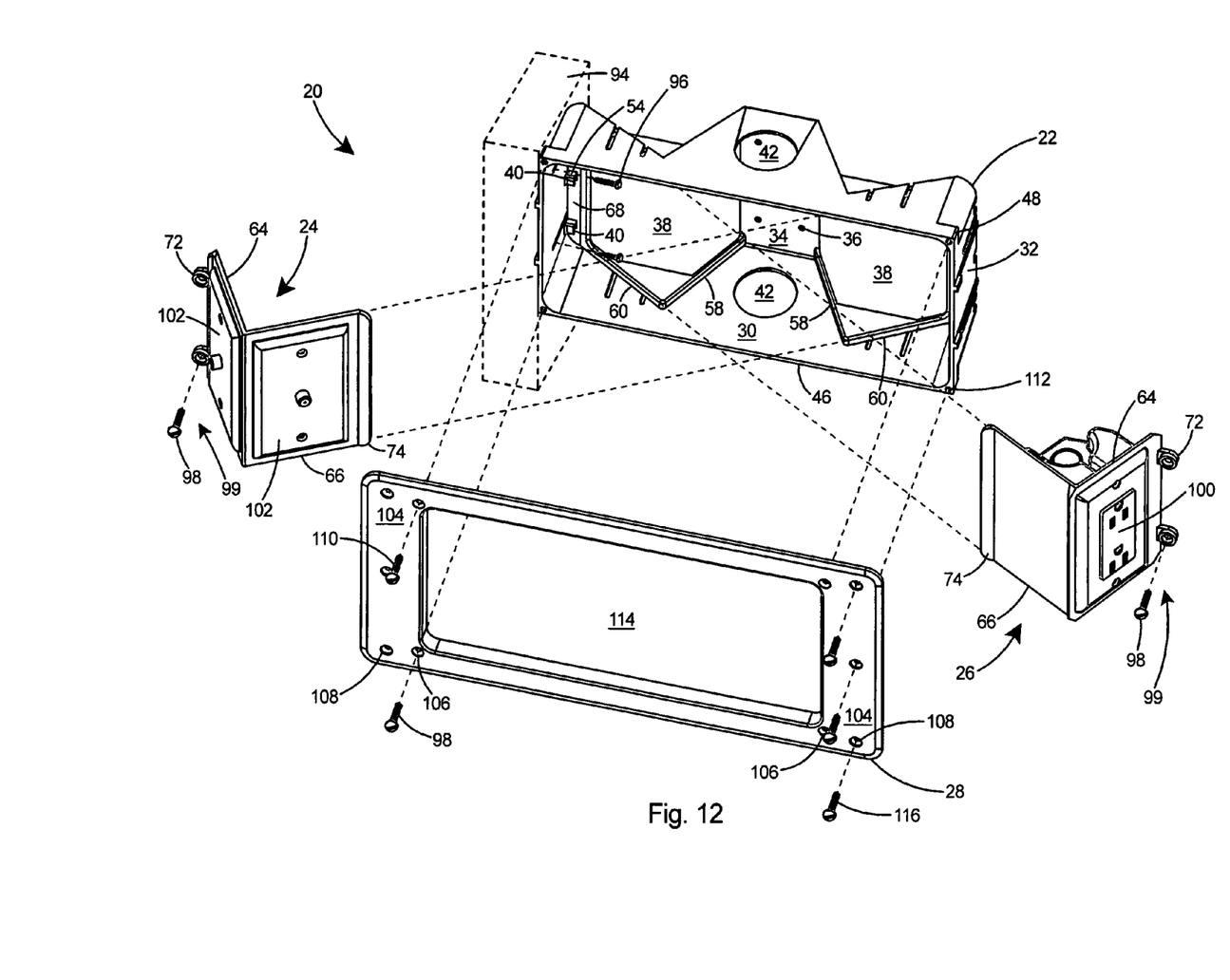
FIG. 12 is an exploded perspective view of the electrical device mounting assembly of the present invention including a high voltage component mounted in the high voltage box and two low voltage components mounted in the low voltage plate.

Reference is made to FIG. 12 for an explanation of the operation of the electrical device mounting assembly 20 of the present invention. The electrical device mounting assembly 20 can be mounted to a wall and configured to hold two high voltage electrical boxes 26, two low voltage mounting plates 24, or one high voltage electrical box and one low voltage mounting plate. Thus, the electrical device mounting assembly can be configured to provide the proper amount of high and low voltage connection points depending on the needs of the situation. The particular arrangement depicted in FIG. 12 depicts the electrical device mounting assembly 20 being configured to hold one high voltage electrical box 26 and one low voltage mounting plate 24. The electrical device mounting assembly can be used for either new work, where sheetrock has not been installed over the studs, or old work situations. For an old work installation, a portion of the existing sheetrock is removed, typically between two studs, in the location where electrical services are required. One end of the electrical device mounting assembly 20 is typically secured to a stud 94 with fasteners 96 as shown.

After the electrical device mounting assembly 20 is secured at one end to the stud 94, the assembly may be configured with two low voltage plates, two high voltage boxes, or one of each as desired. The high voltage box 26 and low voltage plate 24 can be installed into the electrical device mounting assembly 20 in any order by sliding the second lip 74 of the second frame 66 into the gaps 54 between the tabs 40 and corner wall 68. The tabs 40 perform a critical function for the electrical device mounting assembly 20 as they enable an installer to rapidly configure the box with mounting devices 24 and 26. The tabs 40 enable the mounting device 24 or 26 to easily seat in its proper place in the box assembly 20 as the tabs 40 enable the second lip 74 of the mounting device to slide into the gaps 54 formed by the tabs. Brace 58 and second brace 60 of mounting frame 22 brace and support the first frame 64 and second frame 66 respectively of the low voltage mounting plate 24 and high voltage box 26 when they are inserted into the mounting frame 22 and position the frames 64 and 66 at the desired angle with respect to the front face 46 of the mounting frame 22. The mounting devices 24 and 26 are then secured to the mounting frame 22 by driving fasteners 98 through bosses 72 of mounting devices 24 and 26 into apertures 36 in the back wall 34 of mounting frame 22. Fasteners 98 and bosses 72 therefore form an attachment arrangement 99 for securing the mounting devices 24 and 26 within the enclosure 56 of the mounting frame 22. In FIG. 12, the high voltage box 26 is depicted with a duplex receptacle 100 installed therein and low voltage mounting plate 24 is depicted with two CATV connector plates 102 installed therein. The installation is completed by securing trim plate to the mounting frame 22. Trim plate 28 includes two end flanges 104 with inner apertures 106 and outer apertures 108 therein. After the mounting frame 22 has been configured, fasteners 110 are driven into bores 112 in each corner of the front face 46 of the mounting frame 22. The high and low voltage electrical components 100 and 102 will then be accessible through the opening 114 in trim plate 28. After the trim plate 28 is secured to the mounting frame 22, mounting fasteners 116 may be driven through the end flange 104 opposite the stud 94 to secure the opposing end of the electrical device mounting assembly 20 to the wall.

Figure 13:
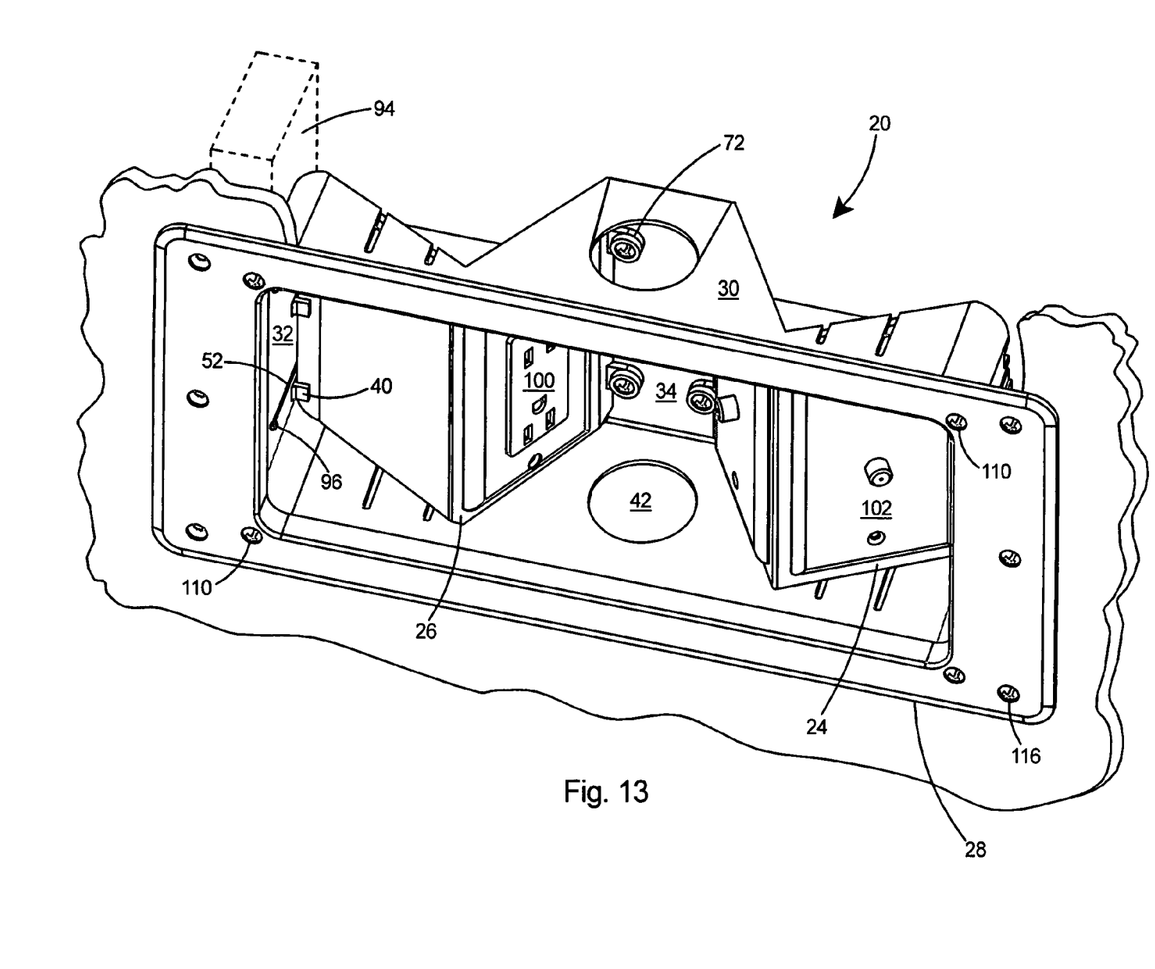
FIG. 13 is a perspective view of the electrical device mounting assembly of the present invention mounted to a wall and with a high voltage component and two low voltage components mounted therein.

The completed electrical device mounting assembly 20 is depicted in FIG. 13. A low voltage mounting plate 24 has been installed in the right side of the assembly and a high voltage box 26 has been installed in the left side of the assembly. If an alternative arrangement of high and low voltage components is desired, the electrical device mounting assembly 20 may be configured with two high voltage boxes or with two low voltage mounting plates in lieu of one of each type electrical mounting device.

Figure 14:
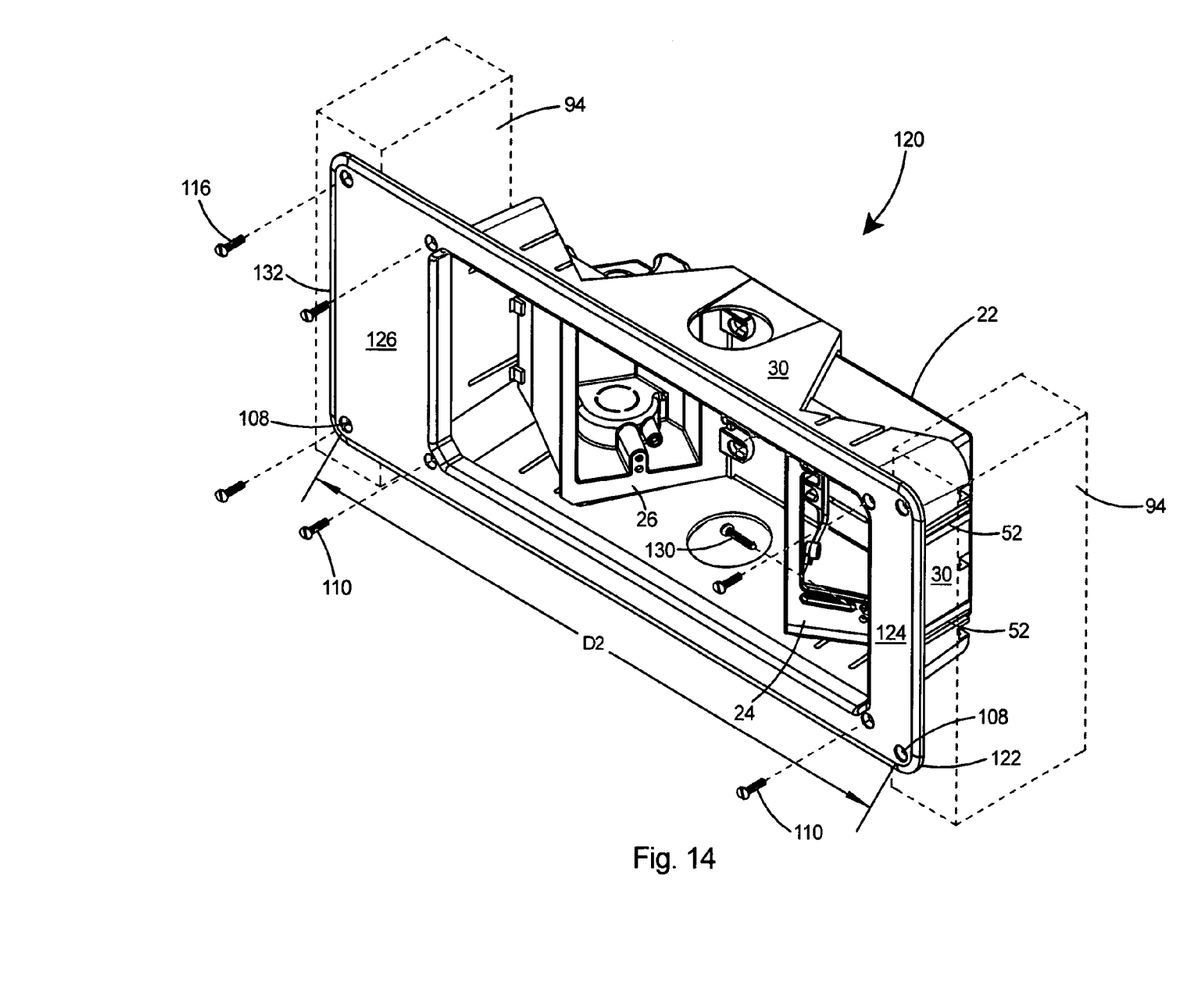
FIG. 14 is a perspective view of a second and preferred embodiment of an electrical device mounting assembly according to the present invention mounted to a wall.

With reference to FIG. 14 there is shown a second and preferred embodiment of an electrical device mounting assembly 120. Mounting assembly 120 includes a mounting frame 22, low voltage mounting plate 24, and high voltage box 26 similar to the first embodiment. Mounting assembly 120 however includes a trim plate 122 in which the end flanges are nonsymmetrical including a first end flange 124 and a second end flange 126. As shown in FIG. 14, the second end flange 126 is wider than the first end flange 124. Trim plate 122 is sized to provide spacing equal to the standard spacing between studs. The spacing, denoted by D2 in FIG. 14, is preferably 16-inches between the outer apertures 108 in the end flanges 124 and 126 to match the conventional center-to-center spacing between adjacent studs. The distance between sidewall 30 of mounting frame 22 and the outer aperture 108 of first end flange 124 is approximately half the width of a conventional stud 94. Thus the mounting frame 22 can be jammed against a stud 94 and secured thereto with fasteners 130 driven through slots 52 in sidewall 30 into stud 94. After the low voltage mounting plate 24 and high voltage box 26 are installed in the mounting frame 22, trim plate 122 is secured to the mounting frame 22 by fasteners 110. The opposite end 132 of the trim plate 122 is then secured to the opposite stud 94 with fasteners 116. The second embodiment of the trim plate 122 according to the present invention therefore provides the ability to anchor the electrical device mounting assembly 120 to a stud 94 at both ends of the assembly, thereby providing an electrical device mounting assembly 120 that is secured at both ends to the wall.

As shown in FIG. 11, the high voltage box 26 may include a knockout or removable wall portion 92 therein in the recessed area 90 in one of the end walls 86. The recessed area 90 in the sidewall 86 enables the use of electrical fittings or connectors such as the Black Button™ push-in fitting or connector 134 for connecting non-metallic cable to electrical boxes, which connector 134 is available from Arlington Industries of Scranton, Pa. The recessed area 90 permits use of the connectors 134 while preventing the connectors from projecting beyond the sidewall 86 and interfering with placement of the electrical device mounting assembly 20 in locations where space is tightly restricted.

The various portions of the electrical device mounting assembly 20, including the mounting frame 22, low voltage mounting plate 24, high voltage box 26, and trim plate 28, may be constructed of metal or plastic. Most preferably, the mounting frame 22, low voltage mounting plate 24, high voltage box 26, and trim plate 28 are each molded in one piece of plastic. Suitable plastics include polycarbonate and polyvinylchloride.

Having thus described the invention with reference to a preferred embodiment, it is to be understood that the invention is not so limited by the description herein but is defined as follows by the appended claims.

What is claimed is:

1. An electrical device mounting assembly comprising:
   a mounting frame including side walls and end walls having a front face, a back wall defining an enclosure therein, and a depth defined as the distance between said front face and said back wall;
   a brace integral with and extending from said side walls of said mounting frame into said enclosure, said brace at an oblique angle with respect to said front face of said mounting frame;
   a mounting device including a first frame for engaging said brace of said mounting frame, said brace positioning said mounting device at said oblique angle with respect to said front face of said mounting frame and recessing said mounting device within said mounting frame;
   said depth of said mounting frame is minimized by orienting said mounting device at said oblique angle with respect to said front face of said mounting frame;
   an attachment arrangement for securing said mounting device within said enclosure; and
   a trim plate for attachment to said front face of said mounting frame.

2. The electrical device mounting assembly of claim 1 wherein said mounting frame includes
   a corner wall;
   tabs extending from said walls; and
   a gap between said tabs and said corner wall.

3. The electrical device mounting assembly of claim 2 wherein said mounting device includes
   a mounting boss extending from said first frame;
   a second frame integral with said first frame; and
   a second lip extending from said second frame, said second lip of said second frame for engaging said tabs of said mounting frame.

4. The electrical device mounting assembly of claim 3 wherein said mounting device includes
   a low voltage mounting plate for mounting one or more low voltage components thereto; and
   a high voltage box for mounting a high voltage component therein.

5. The electrical device mounting assembly of claim 4 wherein said low voltage mounting plate includes
   a frame opening within said first frame and said second frame; and
   component connection points on said first and second frames.

6. The electrical device mounting assembly of claim 5 wherein said component connection points each include a component boss and a bore within said component boss.

7. The electrical device mounting assembly of claim 3 wherein
   said first frame is at an angle with respect to said second frame; and
   said angle is between 60 and 120 degrees.

8. The electrical device mounting assembly of claim 4 wherein said high voltage box includes a sidewall and end wall extending from said first and second frames and defining an electrical enclosure therein.

9. The electrical device mounting assembly of claim 8 wherein said high voltage box includes a recessed area in said end wall and a knockout wall portion in said recessed area.

10. The electrical device mounting assembly of claim 3 wherein
    said first frame includes a first lip extending there from; and
    said mounting boss extends from said first lip.

11. The electrical device mounting assembly of claim 10 wherein said first lip is at an angle of 60 degrees with respect to said first frame.

12. The electrical device mounting assembly of claim 3 wherein said second lip is at an angle of 30 degrees with respect to said second frame.

13. The electrical device mounting assembly of claim 1 wherein said mounting frame includes one or more slots in said end walls, said slots capable of receiving one or more fasteners therein for securing said mounting frame to a stud.

14. The electrical device mounting assembly of claim 1 including a second brace extending from said side walls of said mounting frame into said enclosure, said second brace at an angle with respect to said front face of said mounting frame; and
    said second brace integral with one end of said brace.

15. The electrical device mounting assembly of claim 14 wherein
    said brace of said mounting frame supports said first frame of said mounting device when said mounting device is inserted therein; and
    said second brace of said mounting frame supports said second frame of said mounting device when said mounting device is inserted therein.

16. The electrical device mounting assembly of claim 1 wherein said trim plate includes an opening therein, said opening in said trim plate providing access to said mounting devices mounted within said mounting frame.

17. The electrical device mounting assembly of claim 1 wherein
    said depth of said mounting frame according to the present invention is 3.8-inches or less.

18. The electrical device mounting assembly of claim 1 wherein said trim plate includes inner apertures and outer apertures therein.

19. The electrical device mounting assembly of claim 18 wherein
- said trim plate includes a spacing between said outer apertures; and
- said spacing between said outer apertures in said trim plate is equal to the spacing between studs.

20. The electrical device mounting assembly of claim 18 wherein
- said front face of said mounting frame includes bores therein; and
- said trim plate is secured to said mounting frame by fasteners secured through said inner apertures in said trim plate into said bores in said front face of said mounting frame.

\* \* \* \* \*